US012753700B2

(12) United States Patent
Coleman

(10) Patent No.: US 12,753,700 B2
(45) Date of Patent: Oct. 6, 2026

(54) HIGH STRENGTH COMPOSITE STRUCTURE AND METHOD OF PRODUCTION

(71) Applicant: Colin Coleman, Okehampton (GB)

(72) Inventor: Colin Coleman, Okehampton (GB)

( * ) Notice: Subject to any disclaimer, the term of this patent is extended or adjusted under 35 U.S.C. 154(b) by 5 days.

(21) Appl. No.: 19/032,755

(22) Filed: Jan. 21, 2025

(65) Prior Publication Data

US 2025/0277454 A1 Sep. 4, 2025

Related U.S. Application Data

(60) Provisional application No. 63/560,992, filed on Mar. 4, 2024.

(51) Int. Cl.
*F01D 5/28* (2006.01)
*B32B 5/02* (2006.01)
*B32B 5/26* (2006.01)
*B32B 27/12* (2006.01)

(52) U.S. Cl.
CPC .............. *F01D 5/282* (2013.01); *B32B 5/024* (2013.01); *B32B 5/263* (2021.05); *B32B 27/12* (2013.01); *B32B 2250/40* (2013.01); *B32B 2262/0269* (2013.01); *B32B 2262/106* (2013.01); *B32B 2307/584* (2013.01); *B32B 2307/71* (2013.01); *B32B 2605/18* (2013.01); *F05D 2230/23* (2013.01); *F05D 2300/6034* (2013.01)

(58) Field of Classification Search
CPC ............................ F01D 5/282; F05D 2230/23
See application file for complete search history.

(56) References Cited

U.S. PATENT DOCUMENTS

| | | | | |
|---|---|---|---|---|
| 3,905,398 | A * | 9/1975 | Johansen | F16L 11/085 138/140 |
| 4,273,601 | A * | 6/1981 | Weingart | F03D 1/065 156/190 |
| 4,384,595 | A * | 5/1983 | Washkewicz | F16L 11/082 428/36.2 |
| 4,594,761 | A * | 6/1986 | Murphy | F01D 5/282 29/418 |
| 2016/0201480 | A1* | 7/2016 | Foster | B29D 99/0028 415/200 |
| 2019/0299500 | A1* | 10/2019 | Gurney | F01D 25/005 |
| 2019/0353040 | A1* | 11/2019 | Robertson, Jr. | B29C 70/682 |
| 2021/0078217 | A1* | 3/2021 | Okabe | B29C 70/446 |
| 2024/0084707 | A1* | 3/2024 | Lieu | F01D 5/282 |

* cited by examiner

*Primary Examiner* — David R Deal
(74) *Attorney, Agent, or Firm* — RosserIP, LLC; Roy Rosser

(57) ABSTRACT

A lightweight, high-strength, heat-resistant composite structure and method of fabrication are described. The structure comprises a lightweight polymer core enclosed by an inner casing of cured, resin-impregnated carbon fiber layers, and an outer housing of cured, resin-impregnated aramid fabric layers. Additional configurations include interspersed layers of carbon and aramid fabrics within the casings for enhanced properties. An optional outer protective layer, such as helicopter tape, provides resistance to UV light, abrasion, and environmental factors. The polymer core can be flat or shaped and made from materials like polypropylene or TPU, enabling applications such as panels, cargo containers, fan blades, and airfoils. The manufacturing process involves layered fabric layups in a two-part mold, followed by curing under heat, pressure, or time to produce the final structure.

9 Claims, 3 Drawing Sheets

201

HIGH STRENGTH COMPOSITE STRUCTURE AND METHOD OF PRODUCTION

CROSS REFERENCE TO RELATED APPLICATIONS

This application claims priority to US provisional patent application U.S. 63/560,992 filed on Mar. 4, 2024 entitled “Inexpensive Impact Resistant Shell and Method of Production” the contents of which are hereby fully incorporated by reference.

BACKGROUND OF THE INVENTION

The invention relates to composite structures and more particularly to light weight, high strength, heat resistant composite structures and most particularly to such structures made of a combination of carbon fiber fabrics and aramid fabrics.

Carbon fiber structures offer many benefits, such as high strength-to-weight ratio, corrosion resistance, and excellent rigidity. However, they have some shortcomings that can affect their suitability for certain applications. Carbon fiber is strong in tension but can be brittle and prone to sudden failure under certain types of loading, such as impact or sharp bending. For instance, it is less resistant to impact damage than metals.

Aramid fabrics such as, but not limited to, Kevlar™ and Twaron™ are, on the other hand, highly impact resistant. Aramid fibers have exceptional tensile strength, which allows them to absorb and distribute the energy from impacts across a wide area, reducing the likelihood of catastrophic failure.

What is desirable are structures that may combine the beneficial properties of both carbon fiber fabrics and aramid fabrics, without introducing undesirable shortcomings.

SUMMARY OF THE INVENTION

Inventive light weight, high strength, heat resistant composite structures and method of making them are disclosed.

In a preferred embodiment, a lightweight polymer core may be enclosed by an inner casing consisting of one or more layers of cured, resin impregnated carbon fiber fabric. There may then be an outer housing enclosing inner casing. The outer housing may, for instance, consist of one or more layers of cured, resin impregnated aramid fabric.

In a further embodiment, the inner casing may have at least one layer of aramid fabric interspersed between two of the layers of cured, resin impregnated carbon fiber fabric.

Alternately, or in addition, the outer housing may have at least one layer of cured resin impregnated carbon fiber fabric interspersed between two of the layers of cured, resin impregnated aramid fabric.

The composite structure may also have an outer protective layer such as, but not limited to, a layer of helicopter tape, applied over it. Such a layer may, for instance, protect the structure against undesirable environmental elements such as, but not limited to, UV light, mild abrasion and acids.

The lightweight polymer core may, for instance, be a flat sheet made of a material such as, but not limited to, a polypropylene, a PETG (Polyethylene Terephthalate Glycol). Nylon, a TPU (Thermoplastic Polyurethane) and Acrylonitrile butadiene styrene (ABS). Such a core may result in a light weight, high strength, heat resistant composite panel or sheet. Such panels may be joined together to form structures such as, but not limited to, cargo containers for aircraft.

Alternately, the lightweight polymer core may have a more complex shape and may be used to produce structures such as, but not limited to, fan blades, airfoils and propeller blades.

The composite structure may, for instance, be made using suitable two parts, or claim shell, mold that may be shaped to match or enclose the lightweight polymer core. The manufacturing process may then proceed by laying up one or more layers of resin impregnated aramid fabric onto a lower part of the two-part mold to create a lower, outer housing. After that, a lower inner casing may be formed by laying up one or more layers of resin impregnated carbon fiber fabric to create a lower inner casing. The polymer core may then be placed onto the lower inner casing, after which one or more layers of resin impregnated carbon fiber fabric may be laid on to create an upper inner casing. Then an upper, outer housing may be created by laying up one or more layers of resin impregnated aramid fabric onto upper inner casing, at which point a laid up composite structure may have been completed. The two-part mold may then be reformed by placing the upper part the mold to connect with the lower part while enclosing the laid up laminated structure. The two-part mold containing the laid up laminated structure may then be cured while contained In the two-part mold. The curing may, for instance, be accomplished by suitable heating, pressure or time, or some combination thereof. After curing is completed, the mold may be separated and the cured composite structure removed.

Therefore, the present invention succeeds in conferring the following, and others not mentioned, desirable and useful benefits and objectives.

It is an object of the present invention to provide an inexpensive light weight, high strength, heat resistant composite structure.

It is another object of the present invention to produce light weight, high strength, heat resistant composite panels that may be used to build more complex structures.

DETAILED DESCRIPTION OF THE INVENTION

Figure 1:
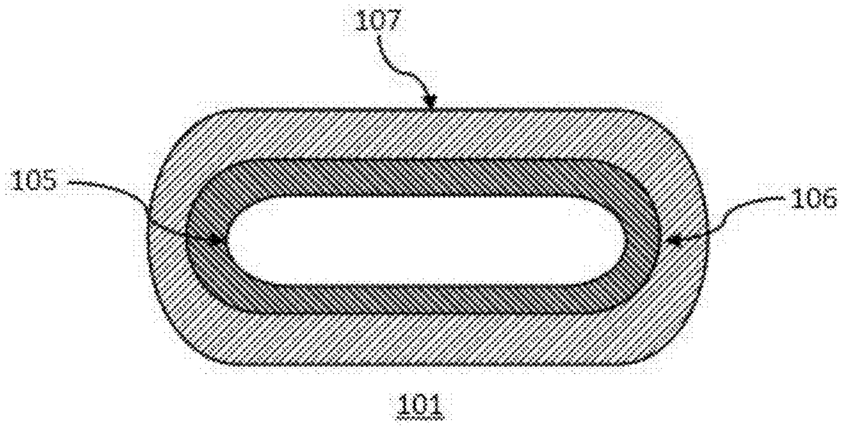
FIG. 1 shows a schematic cross-sectional view of a light weight, high strength, heat resistant composite structure of the present invention.

The preferred embodiments of the present invention will now be described with reference to the drawings. Identical elements in the various figures are identified, in so far as possible, with the same reference numerals. The embodiments that are described in detail are provided by way of explanation of the present invention, which is not intended to be limited thereto. In fact, those of ordinary skill in the art may appreciate upon reading the present specification and viewing the present drawings that various modifications and variations can be made thereto.

FIG. 1 shows a schematic cross-sectional view 101 of a light weight, high strength, heat resistant composite structure of the present invention.

The structure may consist of a lightweight polymer core 105 surrounded by a inner casing 106 and an outer housing 107.

The lightweight polymer core 105 may, for instance, be made of a material such as, but not limited to, a polypropylene, a PETG (Polyethylene Terephthalate Glycol), Nylon, a TPU (Thermoplastic Polyurethane) and Acrylonitrile butadiene styrene (ABS), or some combination thereof. The material may be formed to an appropriate or required shape by any suitable well known machining process such as, but not limited to, 3D printing, additive manufacturing, milling, or some combination thereof.

The inner casing 106 may, for instance, be made up of one or more layers 209 of cured, resin impregnated carbon fiber fabric. Carbon fiber structures are well known for their high strength-to-weight ratio, corrosion resistance, and excellent rigidity. However, while carbon fiber is strong in tension it may be brittle and therefore less resistant to impact damage than other materials such as metals. An impact resistant outer layer to protect the carbon fiber layers is therefore desirable.

Such an impact resistant outer housing 107 to enclose the inner casing may, for instance, be fabricated using one or more layers of cured, resin impregnated aramid fabric.

Aramid fabrics such as, but not limited to, Kevlar™ and Twaron™ are well known for being highly impact resistant. Aramid fibers have exceptional tensile strength, which may allow them to absorb and distribute energy from impacts across a wide area, reducing the likelihood of catastrophic failure. Kevlar™ is manufactured by DuPont de Nemours, headquartered in Wilmington, DE. Twaron is made by Teijin Twaron, B.V. which is based in Arnhem, The Netherlands.

Carbon fiber fabrics are made by a variety of companies including Hexcell Corporation, headquartered in Stamford, CT.

Figure 2:
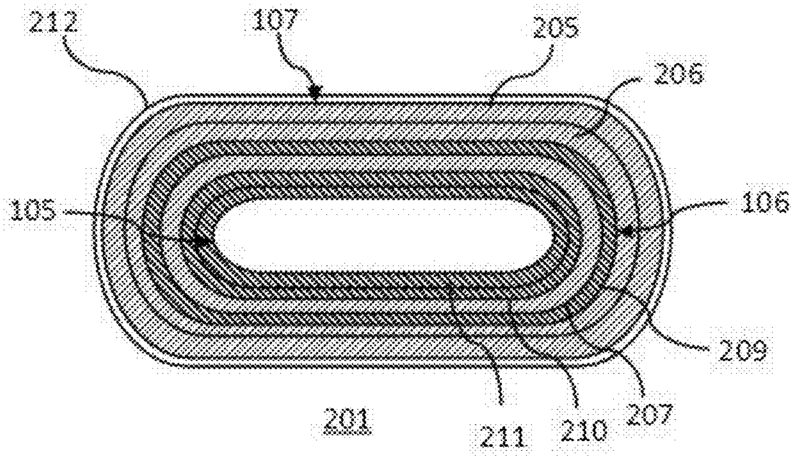
FIG. 2 shows a schematic cross-sectional view of a light weight, high strength, heat resistant composite structure of a further embodiment of the present invention.

FIG. 2 shows a schematic cross-sectional view 201 of a light weight, high strength, heat resistant composite structure of a further embodiment of the present invention.

As shown in FIG. 2, the outer housing 107 may consist of a first layer 205 and a second layer 206 of cured, resin impregnated aramid fabric.

The inner casing 106 may consist of first layer 209 of cured, resin impregnated carbon fiber fabric followed by a third layer 207 of cured, resin impregnated aramid fabric. This third layer 207 of cured, resin impregnated aramid fabric may be interspersed between two layers of carbon fiber fabric, namely the first layer 209 of cured, resin impregnated carbon fiber fabric and the second layer 210 of cured, resin impregnated carbon fiber fabric. There may also be a third layer 211 of cured, resin impregnated carbon fiber fabric that may be enclosing the lightweight polymer core 105.

The structure may also be surrounded by an outer protective coating that may be a material such as, but not limited to, helicopter tape 212. This final outer layer may, for instance, protect the structure against undesirable environmental elements such as, but not limited to, UV light, mild abrasion and acids.

One of ordinary skill in the art may appreciate that although FIG. 2 shows a particular interleaving of aramid/carbon fiber layers, many alternate arrangements of interleaving may be envisaged. One purpose of having a layer of aramid interspersed between two layers of carbon fiber may be to allow impact protection of the innermost layers of carbon fiber in the event of a breach of the outermost layer of carbon fiber.

An alternative way of describing FIG. 2 may be to say that outer housing consists of at least one layer of cured carbon fiber fabric interspersed between two layers of cured, resin impregnated aramid fabric.

The nature of the final light weight, high strength, heat resistant composite structure may depend on the shape of the lightweight polymer core. For instance, if the core is a flat sheet the final result in a light weight, high strength, heat resistant composite panel or sheet. Such panels may be joined together to form structures such as, but not limited to, cargo containers for aircraft.

Alternately, the lightweight polymer core may have a more complex shape and may be used to produce structures such as, but not limited to, fan blades, airfoils and propeller blades.

When laying up the carbon fiber fabric for more complex shapes having curves, the choice of carbon fiber fabric may be important as different weaves have different draping characteristics. For instance, the best weaves for draping are weaves such as, but not limited to, a satin weaves, a twill weave, or a bi-directional weave with fine wefts. Due to cost considerations, a preferred choice of carbon fiber fabric for a relatively complex structure such as, but not limited to, a fan or propeller blade may be a twill weave carbon fiber fabric.

Figure 3:
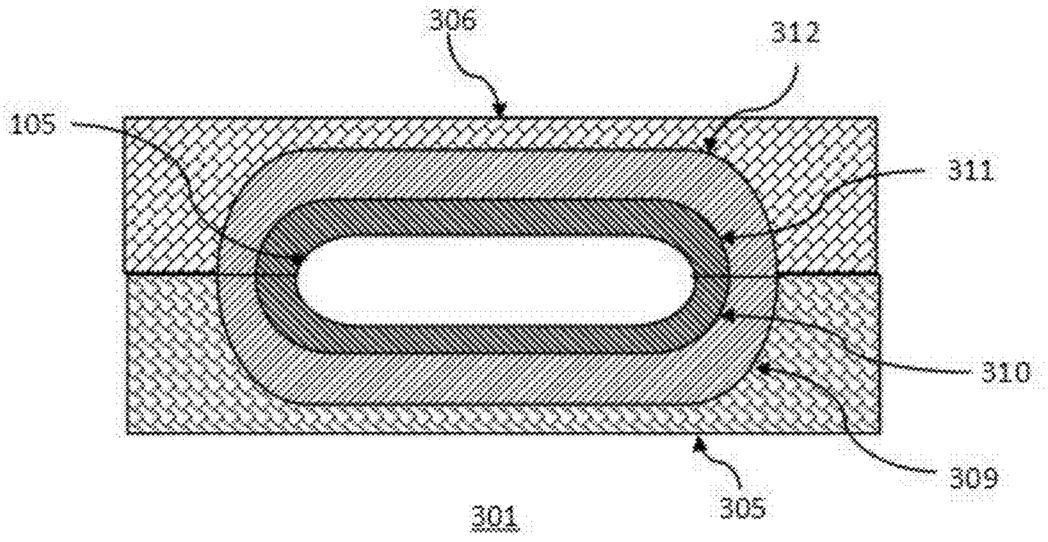
FIG. 3 shows a schematic cross-sectional view of two-part mold containing a laid up composite structure.

FIG. 3 shows a schematic cross-sectional view 301 of two-part mold containing a laid up composite structure.

The two-part mold may be shaped to enclose the lightweight polymer core 105 and the layers of aramid and carbon fiber surrounding it. As shown the two-part, or claim shell, mold may consist of a lower part 305 and an upper part 306.

In the manufacturing process, the lower, outer housing 309 of aramid fabric may be laid up first on the inner surface of the lower part of the mold, followed by the lower inner casing 310 of carbon fiber fabric. The lightweight polymer core 105 may the be added, on top of which the upper inner casing 311 of carbon fiber fabric may be added. Next the upper, outer housing 312 of aramid fiber layers may be added. Finally, the upper part 306 of the two-part mold may be placed on top of the lower part to reform the mold and enclose the laid up laminated structure.

Figure 4:
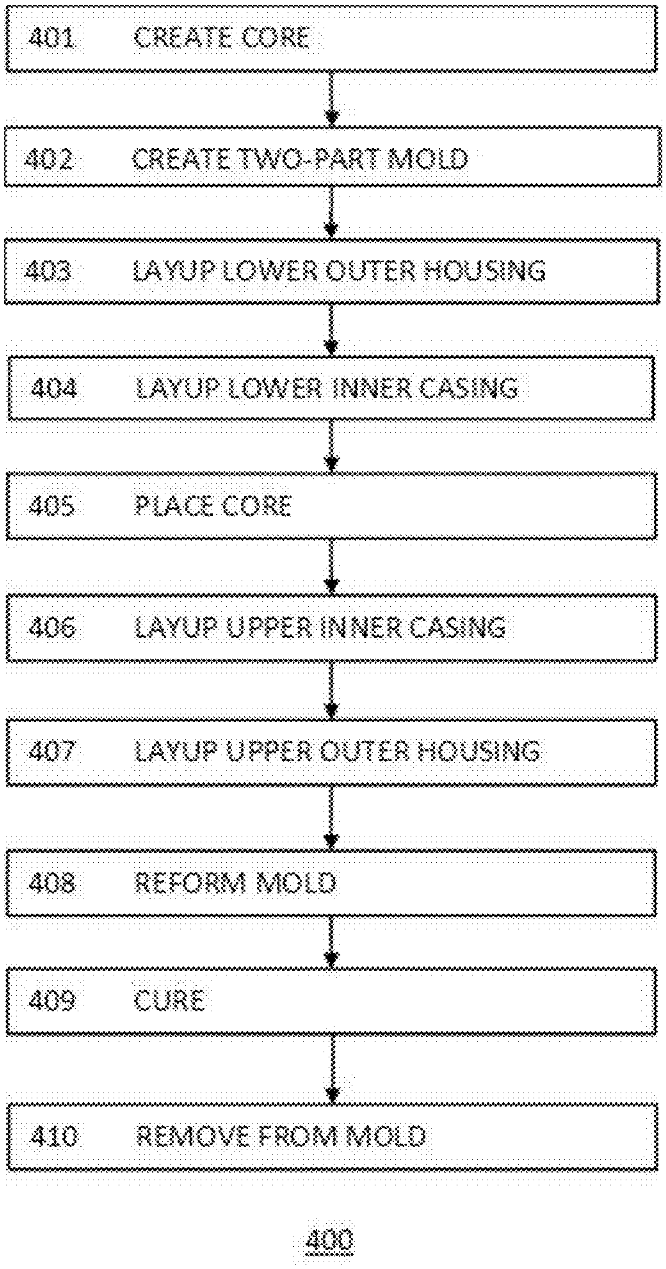
FIG. 4 is a flow diagram showing representative steps in creating a light weight, high strength, heat resistant composite structure of the present invention.

FIG. 4 is a flow diagram 400 showing representative steps in creating a light weight, high strength, heat resistant composite structure of the present invention.

In Step 401 "CREATE CORE" a lightweight polymer core may be created from a suitable material such as, but not limited to, a polypropylene, a PETG (Polyethylene Terephthalate Glycol). Nylon, a TPU (Thermoplastic Polyurethane) and Acrylonitrile butadiene styrene (ABS).

The material may be shaped to an appropriate or required shape by any suitable well known machining process such as, but not limited to, 3D printing, additive manufacturing, milling, or some combination thereof.

In Step 402 "CREATE TWO-PART MOLD" a two-part, or clam shell mold may be created.

This mold may be made of a suitable material such as, but not limited to, plywood or a suitable polymer having properties similar to the core. A suitable material may be one that has a coefficient of expansion that is a reasonable match to that of the core material and carbon fiber and aramid fabrics. The material may also have good release characteristics, such as, but not limited to, a surface or surface finish that may allow the cured composite structure to be easily separated from it. The mold material may be shaped so that the inner surface conforms to the outer surface of the pattern. Plywood may, for instance, be steam heated and then bent, or molded, to conform to the pattern. Molds may also or instead be machined completely of in part by CNC machine methods.

In Step 403 "LAYUP LOWER OUTER HOUSING". In this step one or more layers of resin impregnated aramid fabric may be laid onto a lower part of said two-part mold, thereby creating a lower, outer housing. Prior to laying on the fabric, a release agent may be applied to the inner surface of the mold. The release agent may be a material such as, but not limited to, a wax or a grease that may allow easier separation of the cured composite structure.

In Step 404 "LAYUP LOWER INNER CASING" one or more layers of resin impregnated carbon fiber fabric onto may be laid onto lower, outer housing to create a lower inner casing.

In Step 405 "PLACE CORE" the lightweight polymer core may be placed onto the lower inner casing.

In Step 406 "LAYUP UPPER INNER CASING", one or more layers of resin impregnated carbon fiber fabric may be laid onto the core to create an upper inner casing.

In Step 407 "LAYUP UPPER OUTER HOUSING" one or more layers of resin impregnated aramid fabric may be laid onto upper inner casing to create an upper, outer housing. This may complete a laid up composite structure.

In Step 408 "REFORM MOLD" the upper part of the two-part mold may be connected with the lower part, reforming the mold and enclosing the laid up laminated structure.

In Step 409 "CURE" the two-part mold containing the laid up laminated structure may undergo a curing process in order to create a cured composite structure. The curing may, for instance, be accomplished by suitable heating, pressure or time, or some combination thereof.

In Step 410 "REMOVE FROM MOLD", the two-part mold may be separated, and the cured composite structure may be removed from the mold.

Although this invention has been described with a certain degree of particularity, it is to be understood that the present disclosure has been made only by way of illustration and that numerous changes in the details of construction and arrangement of parts may be resorted to without departing from the spirit and the scope of the invention.

The invention claimed is:

1. A light weight, high strength, heat resistant composite structure, comprising:
- a uniformly solid, 3D printed lightweight polymer core;
- an inner strength providing casing enclosing said core, said inner casing comprising one or more layers of cured, resin impregnated carbon fiber fabric; and,
- an outer housing providing heat and impact resistance enclosing said inner casing, said outer housing comprising one or more layers of cured, resin impregnated aramid fabric.

2. The composite structure of claim 1, where said inner casing comprises at least one layer of aramid fabric interspersed between two of said layers of cured, resin impregnated carbon fiber fabric.

3. The composite structure of claim 2 wherein the inner casing comprises a single layer of aramid material interspersed between two layers of cured, resin impregnated carbon fiber fabric and said outer housing comprises two layers of said cured, resin impregnated aramid material.

4. The composite structure of claim 3 further comprising a layer of tape suitable to protect said structure against undesirable environmental elements including UV light, mild abrasion and acids, applied over said outer housing.

5. The composite structure of claim 1, wherein said outer housing comprises at least one layer of cured, resin impregnated carbon fiber fabric interspersed between two of said layers of cured, resin impregnated aramid fabric.

6. The composite structure of claim 1, further comprising a layer of tape suitable to protect said structure against undesirable environmental elements including UV light, mild abrasion and acids, applied over said outer housing.

7. The composite structure of claim 1, wherein said lightweight polymer core is a flat sheet made of a material that is one of a polypropylene, a PETG (Polyethylene Terephthalate Glycol), Nylon, a TPU (Thermoplastic Polyurethane) and Acrylonitrile butadiene styrene (ABS).

8. The composite structure of claim 1 wherein said solid lightweight polymer core is shaped to be part of a propellor blade and said carbon fiber fabric is a twill weave carbon fiber fabric.

9. A method of making light weight, high strength, heat resistant composite structure, comprising:
- providing a suitably shaped uniformly solid, 3D printed, lightweight polymer core;
- providing a two-part mold shaped to enclose said core;
- laying up one or more layers of resin impregnated aramid fabric onto a lower part of said two-part mold, thereby creating a lower, outer housing;
- laying up one or more layers of resin impregnated carbon fiber fabric onto said lower, outer housing thereby creating a lower inner casing;
- placing said polymer core onto said lower inner casing;
- laying up one or more layers of resin impregnated carbon fiber fabric onto said core thereby creating an upper inner casing;
- laying up one or more layers of resin impregnated aramid fabric onto upper inner casing, thereby creating an upper, outer housing, and thereby completed a laid up composite structure;
- placing an upper part of said two-part mold to connect with said lower part of said two-part mold to enclose said laid up laminated structure;
- curing said two-part mold containing said laid up laminated structure thereby creating a cured composite structure;
- separating said two-part mold; and,
- removing said cured composite structure from said two-part mold.

* * * * *